(12) United States Patent
Mitran

(10) Patent No.: US 7,564,917 B2
(45) Date of Patent: Jul. 21, 2009

(54) MULTICARRIER RECEIVER AND METHOD FOR GENERATING COMMON PHASE ERROR ESTIMATES FOR USE IN SYSTEMS THAT EMPLOY TWO OR MORE TRANSMIT ANTENNAS WITH INDEPENDENT LOCAL OSCILLATORS

(75) Inventor: Patrick Mitran, Cambridge, MA (US)

(73) Assignee: Intel Corporation, Santa Clara, CA (US)

( * ) Notice: Subject to any disclaimer, the term of this patent is extended or adjusted under 35 U.S.C. 154(b) by 620 days.

(21) Appl. No.: 11/264,667

(22) Filed: Nov. 1, 2005

(65) Prior Publication Data

US 2007/0098092 A1 May 3, 2007

(51) Int. Cl.
*H04B 7/02* (2006.01)
(52) U.S. Cl. .................. 375/267; 375/260; 375/299; 375/306; 375/307; 375/349
(58) Field of Classification Search ............. 375/267, 375/260, 299, 306, 307, 347, 349
See application file for complete search history.

(56) References Cited

U.S. PATENT DOCUMENTS

2005/0185730 A1* 8/2005 Hansen et al. ............... 375/267
2006/0018394 A1* 1/2006 van Zelst et al. ............ 375/260

OTHER PUBLICATIONS

Armada, A. G., et al., "Phase Noise and Sub-Carrier Spacing Effects on the Performance of an OFDM Communication System", *IEEE Communications Letters*, 2(1), (Jan. 1998),11-13.
Robertson, P., et al., "Analysis of the Effects of Phase-Noise in Orthogonal Frequency Division Multiplex (OFDM) Systems", *Proceedings, IEEE International Conference on Communications (ICC '95)*, vol. 3, (1995), 1652-1657.

* cited by examiner

*Primary Examiner*—Shuwang Liu
*Assistant Examiner*—Kabir A Timory
(74) *Attorney, Agent, or Firm*—Schwegman, Lundberg & Woessner, P.A.; Gregory J. Gorrie

(57) ABSTRACT

Embodiments of system and method for generating common phase error (CPE) estimates in a multicarrier receiver are generally described herein. Other embodiments may be described and claimed. In some embodiments, the CPE estimates may be generated for each channel between two or more transmit antennas and the multicarrier receiver.

26 Claims, 6 Drawing Sheets

MULTICARRIER RECEIVER

OPERATIONAL ENVIRONMENT

MULTICARRIER TRANSMITTER

MULTICARRIER RECEIVER

TRAINING COMPONENT
OF FIRST OFDM SYMBOL

TRAINING COMPONENT
OF SECOND OFDM SYMBOL

TRAINING COMPONENT
OF FIRST OFDM SYMBOL

TRAINING COMPONENT
OF SECOND OFDM SYMBOL

MULTICARRIER RECEIVER AND METHOD FOR GENERATING COMMON PHASE ERROR ESTIMATES FOR USE IN SYSTEMS THAT EMPLOY TWO OR MORE TRANSMIT ANTENNAS WITH INDEPENDENT LOCAL OSCILLATORS

TECHNICAL FIELD

The present invention pertains to wireless communications. Some embodiments of the present invention pertain to multicarrier receivers. Some embodiments of the present invention pertain to estimating and compensating for uncoupled phase noise resulting from transmit antennas that use independent local oscillators.

BACKGROUND

Some communication systems employ antenna diversity in which two or more transmit antennas may be used to transmit the same data. This redundant transmission of information may be referred to as diversity gain and may help assure that the information is properly received and decoded at the receiver. In some of these systems, the signals transmitted by the transmit antennas may be generated with independent local oscillators. This may result in uncoupled phase noise at the receiver, which decreases the receiver's ability to accurately decode the received information.

BRIEF DESCRIPTION OF THE DRAWINGS

FIGS. 3B and 3C illustrate examples of training components of first and second consecutive multicarrier symbols suitable for use with some embodiments of the present invention;

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
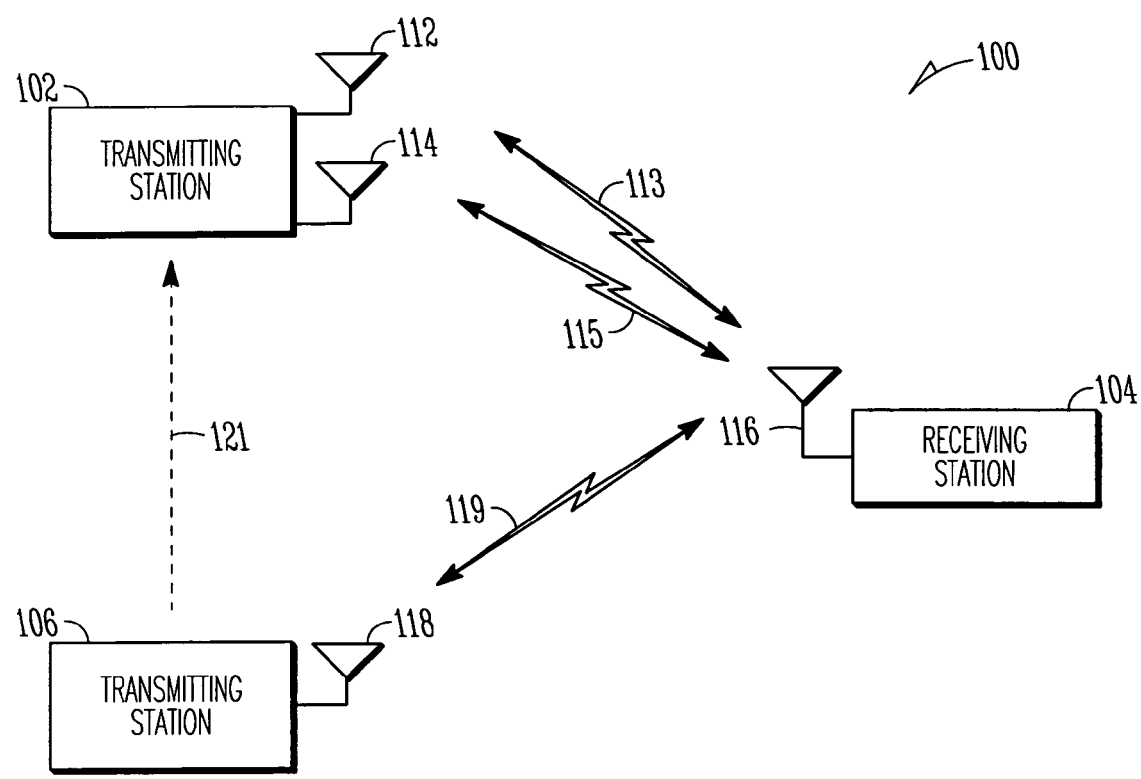
FIG. 1 illustrates an operational environment in which some embodiments of the present invention may be practiced.

FIG. 1 illustrates an operational environment in which some embodiments of the present invention may be practiced. Operational environment 100 may include a plurality of transmitting stations, such as transmitting stations 102 and 106, and one or more receiving stations, such as receiving station 104. Although the terms receiving stations and transmitting stations are used herein to describe wireless communication stations, the receiving and the transmitting stations may each have receiving and transmitting capability.

In some embodiments, transmitting station 102 may transmit to receiving station 104 using two or more transmit antennas 112 and 114. In some of these embodiments, the same information may be concurrently transmitted by both antennas 112 and 114, which may provide for transmit diversity gain. As illustrated in FIG. 1, a first communication channel (illustrated as channel 113) may exist between first transmit antenna 112 and receive antenna 116, and a second communication channel (illustrated as channel 115) may exist between second transmit antenna 114 and receive antenna 116. Each communication channel 113, 115 may have its own channel characteristics and may be compensated for by receiving station 104 when processing information received from transmitting station 102. In these embodiments, the information concurrently transmitted by transmit antennas 112 and 114 may be space-time encoded in a manner described in more detail below.

In some embodiments, the signals transmitted by transmit antennas 112 and 114 may be generated by separate local oscillators resulting in uncoupled phase noise. In these embodiments, receiving station 104 may compensate for the effects of this uncoupled phase noise by using common phase error (CPE) estimates generated for each channel during a transmission burst to decode the received information. These embodiments are described in more detail below.

In some alternate embodiments, transmitting station 106, which may have a single transmit antenna, may be able to take advantage of the benefits of transmit diversity by employing one of the transmit antennas of transmitting station 102. In these embodiments, transmitting station 102 and transmitting station 106 may concurrently transmit space-time encoded versions of the same information for receipt by receiving station 104. In these embodiments, transmitting station 102 may use transmit antenna 112 to transmit information through channel 113 and transmitting station 106 may use transmit antenna 118 to transmit the same information concurrently through channel 119. In these embodiments, the signals transmitted by transmit antennas 112 and 118 are generated by separate local oscillators resulting in uncoupled phase noise. In these embodiments, receiving station 104 may also compensate for the effects of this uncoupled phase noise by generating CPE estimates for each channel during a transmission burst and using the CPE estimates to help decode the received information. Before concurrent transmission by transmit antennas 112 and 118, the information may be space-time encoded in the same way information is encoded for transmission by two or more transmit antennas of a single transmitting station. In these embodiments, transmitting station 106 may convey the information for transmission to transmitting station 102 by communication link 121, which may be either a wireline or wireless communication link. In some embodiments, stations 102, 104 and/or 106 may operate as part of a wireless mesh network, although the scope of the invention is not limited in this respect.

Although transmitting station 102 is illustrated with two transmit antennas 112 and 114, and transmitting station 106 is illustrated as having one transmit antenna 118, the scope of the invention is not limited in this respect, as the transmitting stations may employ many more transmit antennas. Furthermore, although receiving station 104 is illustrated as having one receive antenna 116, the scope of the invention is not limited in this respect, as receiving station 104 may employ more than one receive antenna.

Antennas 112, 114 and 118 may comprise directional or omnidirectional antennas, including, for example, dipole antennas, monopole antennas, patch antennas, loop antennas, microstrip antennas or other types of antennas suitable for transmission of radio-frequency (RF) signals. In some embodiments, instead of two or more antennas, a single antenna with multiple apertures may be used, although the scope of the invention is not limited in this respect.

In some embodiments, transmitting stations 102 and 106 and receiving station 104 may comprise wireless communication devices and may communicate orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the orthogonal subcarriers may be closely spaced OFDM subcarriers. To help achieve orthogonality between the closely spaced subcarriers, each subcarrier may have a null at substantially a center frequency of the other subcarriers and/or each subcarrier may have an integer number of cycles within a symbol period, although the scope of the invention is not limited in this respect.

In some embodiments, transmitting stations 102 and 106 and/or receiving station 104 may be part of wireless access points (APs), such as Wireless Fidelity (WiFi), Worldwide Interoperability for Microwave Access (WiMAX), or broadband communication stations, although the scope of the invention is not limited in this respect. In some embodiments, transmitting stations 102 and 106 and/or receiving station 104 may be part of portable wireless communication devices, such as personal digital assistants (PDAs), laptop or portable computers with wireless communication capability, web tablets, wireless telephones, wireless headsets, pagers, instant messaging devices, digital cameras, access points, televisions or other devices that may receive and/or transmit information wirelessly.

In some embodiments, the frequency spectrums for the multicarrier communication signals may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMAX embodiments, the frequency spectrum for communications may comprise frequencies between 2 and 11 GHz, although the scope of the invention is not limited in this respect.

In some embodiments, transmitting stations 102 and 106 and receiving station 104 may communicate radio-frequency (RF) communications in accordance with specific communication standards, such as the Institute of Electrical and Electronics Engineers (IEEE) standards including IEEE 802.11 (a), 802.11(b), 802.11(g), and/or 802.11(h) standards for wireless local area networks (WLANs), although transmitting stations 102 and 106 and receiving station 104 may also be suitable to transmit and/or receive communications in accordance with other techniques including the Digital Video Broadcasting Terrestrial (DVB-T) broadcasting standard, and the High performance radio Local Area Network (HiperLAN) standard. In some broadband and WiMAX embodiments, transmitting stations 102 and 106 and receiving station 104 may communicate broadband wireless communications in accordance with the IEEE 802.16-2004 standard for wireless metropolitan area networks (WMANs) including variations and evolutions thereof (e.g., IEEE 802.16(e)). For more information with respect to IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments/versions.

Figure 2:
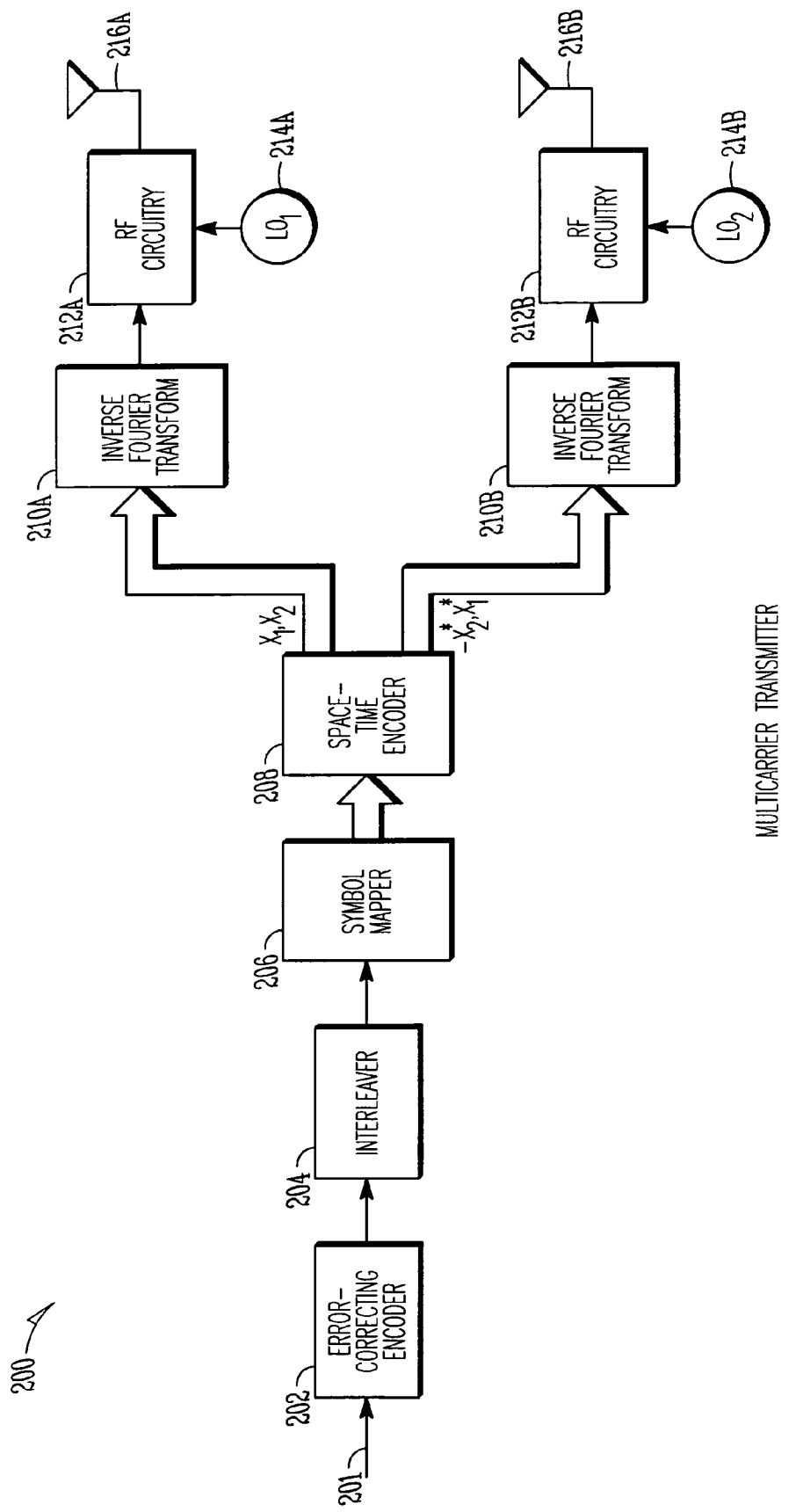
FIG. 2 is a functional block diagram of a multicarrier transmitter in accordance with some embodiments of the present invention.

FIG. 2 is a functional block diagram of a multicarrier transmitter in accordance with some embodiments of the present invention. Multicarrier transmitter 200 may be suitable for use as part of transmitting station 102 (FIG. 1) and/or transmitting station 106 (FIG. 1), although other transmitter configurations may also be suitable. Multicarrier transmitter 200 may include error-correcting encoder 202 to encode input bit stream 201, interleaver 204 to perform an interleaving operation on the encoded bit stream, and symbol mapper 206 to generate constellation symbols from the interleaved bits. In some embodiments, symbol mapper 206 may be a quadrature-amplitude-modulation (QAM) mapper and may generate a constellation symbol from a number of bits depending on the modulation level employed by the system. For example, when a modulation level of 64 QAM is employed, symbol mapper 206 may generate one symbol from six input bits. Other modulation levels that may be employed include binary phase shift keying (BPSK), which communicates one bit per symbol, quadrature phase shift keying (QPSK), which communicates two bits per symbol, 8 PSK, which communicates three bits per symbol, 16-quadrature amplitude modulation (16-QAM), which communicates four bits per symbol, 32-QAM, which communicates five bits per symbol, 128-QAM, which communicates seven bits per symbol, and 256-QAM, which communicates eight bits per symbol. In some embodiments, modulation levels with even higher data communication rates may be used, although the scope of the invention is not limited in this respect. These symbols may be referred to as constellation symbols or points. In some embodiments that employ Alamouti-type encoding/decoding, symbol mapper 206 may generate pairs of constellation symbols for each subcarrier (e.g., tone) of the multicarrier communication signals used for communicating with a receiver.

Multicarrier transmitter 200 may also include space-time encoder 208 to provide the constellation symbols received from symbol mapper 206 to inverse Fourier transform circuitries 210A and 210B. The symbols may be viewed as frequency-domain symbol-modulated subcarriers. Inverse Fourier transform circuitries 210A and 210B may perform an inverse discrete Fourier transform to convert blocks of these frequency-domain signals to the time domain. Each of these converted blocks may be referred to as a multicarrier symbol or an OFDM symbol. Multicarrier transmitter 200 may also include RF circuitries 212A and 212B for generating RF signals from the digital time-domain baseband signals provided by Fourier transform circuitries 210A and 210B, for transmission, respectively, by transmit antennas 216A and 216B. Multicarrier transmitter 200 may also include other functional elements not illustrated in FIG. 2 for ease of understanding.

In some embodiments, the RF signals transmitted by transmit antennas 216A and 216B are generated, respectively, by independent local oscillators 214A and 214B. In these embodiments, the phase noise at a receiving station may be uncoupled. This uncoupled phase noise may be viewed as a slowly varying Gaussian noise process. By uncoupled, the Gaussian noise processes are taken to be uncorrelated or independent. In some cases, the noise process may be correlated but not identical.

In some alternate embodiments, the RF signals transmitted by transmit antennas 216A and 216B may be generated by the same local oscillator, although the scope of the invention is not limited in this respect. One drawback associated with the use of a single local oscillator is that long signal paths may be required between the local oscillator and the RF circuitry of each transmit antenna. Not only do these long signal paths consume chip real estate, but they may increase the amount of noise on the local oscillator signals. The use of separate local oscillators may reduce the length of the signal paths between the local oscillator and the RF circuitry while allowing the local oscillators to be kept close to the RF areas on the chip.

In some embodiments, space-time encoder 208 may be an Alamouti-type decoder in which pairs of constellation symbols are provided to each of inverse Fourier transform circuitries 210A and 210B. In these embodiments, space-time encoder 208 may provide a pair of constellation symbols to inverse Fourier transform circuitry 210A comprising a first ($X_1$) and a second ($X_2$) constellation data symbol. Space-time encoder 208 may also concurrently provide a pair of symbols to inverse Fourier transform circuitry 210B comprising the negative conjugate of the second constellation data symbol ($-X_2^*$) and a conjugate of the first constellation data symbol ($X_1^*$). In these embodiments, multicarrier transmitter 200 may transmit first and second consecutive OFDM symbols. As part of the first consecutive OFDM symbol, multicarrier transmitter 200 may transmit an OFDM symbol portion corresponding to the block of first constellation symbols with first transmit antenna 216A and an OFDM symbol portion corresponding to the block of the negative conjugates of second constellation symbols with second transmit antenna 216B. As part of the second consecutive OFDM symbol, multicarrier transmitter 200 may transmit an OFDM symbol portion corresponding to the block of second constellation symbols with first transmit antenna 216A and an OFDM symbol portion corresponding to the conjugates of the first data symbols with the second transmit antenna 216B. In these embodiments, the information included in the pairs of OFDM symbols generated by space-time encoder 208 is effectively transmitted twice.

In some embodiments, multiple pairs of OFDM symbols may be transmitted consecutively. These may be referred to as transmission bursts. In some embodiments, special OFDM training symbols, referred to as preambles, may precede a transmission burst. The OFDM symbols that follow the OFDM training symbols in a transmission burst may include training components transmitted on the pilot tones/subcarriers, and data components transmitted on the data tones/subcarriers.

In some embodiments, multicarrier transmitter 200 may employ a similar encoding scheme when more than two transmit antennas are employed, although the scope of the invention is not limited in this respect. In these embodiments, the same information may be transmitted on each of the more than two transmit antennas and may be encoded differently for each antenna in a way to take advantage of the transmit antenna diversity.

Figure 3A:
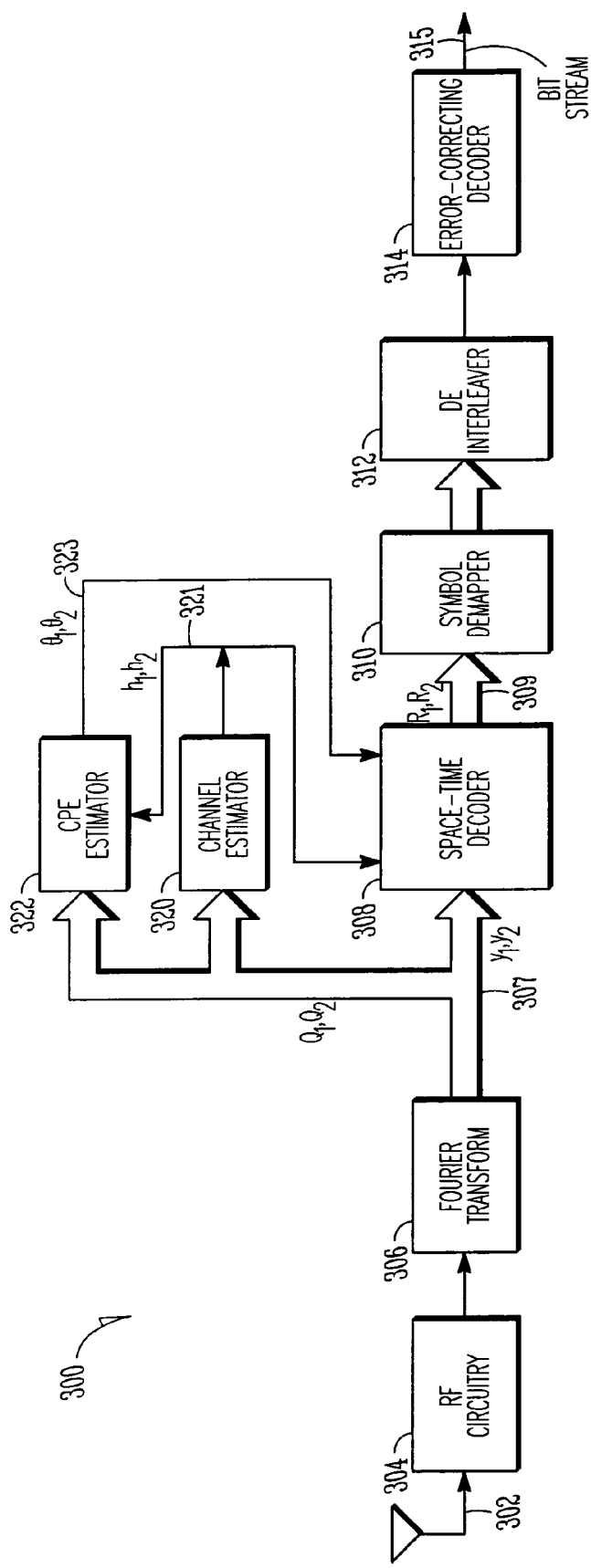
FIG. 3A is a functional block diagram of a multicarrier receiver in accordance with some embodiments of the present invention.

FIG. 3A is a functional block diagram of a multicarrier receiver in accordance with some embodiments of the present invention. Multicarrier receiver 300 may be suitable for use as part of receiving station 104 (FIG. 1), although other receiver configurations may also be suitable. Multicarrier receiver 300 may include receive antenna 302 to receive multicarrier communication signals from one or more transmitting stations, and RF circuitry 304 to downconvert the received signals and generate digital baseband signals. Multicarrier receiver 300 may also include Fourier-transform circuitry 306 to perform a discrete Fourier transform (DFT) on the digital baseband signals provided by RF circuitry 304 and generate frequency-domain signals. In some embodiments, a frequency-domain signal may be generated for each subcarrier of the multicarrier communication signals received by multicarrier receiver 300. Multicarrier receiver 300 may also include a space-time decoder 308 to decode frequency domain signals 307 provided by Fourier transform circuitry 306 and generate decision metrics 309, which may correspond to decoded symbols.

Multicarrier receiver 300 may also include common phase error (CPE) estimator 322 to generate CPE estimates 323 for use by space-time decoder 308, and channel estimator 320 to generate channel estimates 321 for use by space-time decoder 308, among others. In some embodiments, the output of space-time decoder 308 includes a pair of symbols for each subcarrier that represent a QAM constellation point, although the scope of the invention is not limited in this respect. Multicarrier receiver 300 may also include symbol demapper 310 to demap the decoded symbols based on the modulation level to generate groups of bits, which may be deinterleaved by deinterleaver 312 and decoded by error-correcting decoder 314 to generate decoded bit stream 315. Multicarrier receiver 300 may also include other functional elements not specifically illustrated for ease of understanding.

In some embodiments, channel estimation may be performed based on OFDM training symbols (i.e., the preambles). In these embodiments, the channel estimates generated from the preambles may be used for processing all OFDM symbols in the subsequent transmission burst, although the scope of the invention is not limited in this respect.

In accordance with some embodiments of the present invention, CPE estimator 322 may generate CPE estimates 323 and space-time decoder 308 may use channel estimates 321 and CPE estimates 323 to decode data components of consecutively received OFDM symbols. The use of CPE estimates 323 may be especially helpful in situations resulting in uncoupled phase noise at the receiver. These embodiments are described in more detail below. In some embodiments, a CPE estimate may be generated for each transmit-receive antenna pair.

In some embodiments, error-correcting encoder 202 (FIG. 2) may be a forward error-correcting (FEC) encoder, and error correcting decoder 314 may be an FEC decoder. In some embodiments, error correcting encoder 202 (FIG. 2) and error correcting decoder 314 may employ convolutional encoding/decoding or Reed-Solomon encoding/decoding, or a combination thereof, although the scope of the invention is not limited in this respect. In some other embodiments, error correcting encoder 202 (FIG. 2) and error correcting decoder 314 may employ turbo encoding/decoding or low-density parity-check (LDPC) encoding/decoding, as well as other encoding/decoding techniques.

In some embodiments, interleaver 204 (FIG. 2) may be a block interleaver and deinterleaver 312 may be a block deinterleaver. In these embodiments, interleaver 204 (FIG. 2) may operate so as to effectively input a block of bits into a matrix in a row-by-row fashion and may output the bits from the matrix in a column-by-column fashion, although the scope of the invention is not limited in this respect.

In some embodiments, CPE estimator 322 generates CPE estimates 323 (illustrated as $\theta_1$ and $\theta_2$) from per-tone channel estimates 321 (illustrated as $h_1$ and $h_2$) and received training components (illustrated as $Q_1$ and $Q_2$) of consecutively received and demultiplexed OFDM symbols, transmitted by at least two transmit antennas. Space-time decoder 308 may decode data components (illustrated as $Y_1$ and $Y_2$) of consecutively received and demultiplexed OFDM symbols using channel estimates 321 and CPE estimates 323. In these embodiments, CPE estimator 322 may generate a first CPE estimate ($\theta_1$) for a first channel between the receiver and a transmitter and may generate a second CPE estimate ($\theta_2$) for a second channel between the receiver and the transmitter. The first channel, for example, may be defined by first transmit antenna 112 (FIG. 1) and receive antenna 116, and the second channel, for example, may be defined by second transmit antenna 114 and receive antenna 116. In some embodiments, the training portions of the OFDM symbols may be referred to as pilot symbols which may be transmitted on predetermined pilot tones. These training constellation symbols of each OFDM symbol may be known or predetermined. Some embodiments may employ up to eight or more pilot subcarriers/tones, although the scope of the invention is not limited in this respect.

In accordance with some embodiments, space-time decoder 308 either rotates or counter-rotates versions of channel estimates 321 by one of CPE estimates 323 for use in weighting and combining of the received and demultiplexed OFDM symbols 307 to generate decision metrics 309 (illustrated as $R_1$ and $R_2$) corresponding to encoded symbols $X_1$ and $X_2$ (FIG. 2) respectively. Channel estimator 320 may determine channel estimates 321 for the first and the second channels by correlating the received OFDM training symbols (i.e., the preambles) or a training sequence with the known preambles that were transmitted by the transmitter. OFDM symbols 307 may include both training components and data components.

In some embodiments, space-time decoder 308 may determine a first decision metric ($R_1$) for a first of the consecutively transmitted OFDM symbols by performing for each tone a counter-rotation by the first CPE estimate ($\theta_1$) of the complex conjugate of the first channel estimate ($h_1^*$), multiplied with the received constellation data point ($Y_1$) of the first received OFDM symbol and summed with a rotation by the second CPE estimate ($\theta_2$) of the second channel estimate ($h_2$) multiplied with the complex conjugate of the received constellation data point ($Y_2^*$) of the second received OFDM symbol.

In these embodiments, space-time decoder 308 may determine a second decision metric ($R_2$) for a second of the consecutively transmitted OFDM symbols by performing for each tone a rotation by the first CPE estimate ($\theta_1$) of the first channel estimate ($h_1$) multiplied with the complex conjugate of the received constellation data point ($Y_2^*$) of the second received OFDM symbol and subtracted from a counter-rotation by the second CPE estimate ($\theta_2$) of the complex conjugate of the second channel estimate ($h_2^*$) multiplied with the received constellation data point ($Y_1$) of the first received OFDM symbol.

In some embodiments, space-time decoder 308 may use the following equations for each tone to generate decision metrics $R_1$ and $R_2$:

$$R_1 = e^{-j\theta_1} h_1^* Y_1 + e^{j\theta_2} h_2 Y_2^*$$

$$R_2 = e^{-j\theta_2} h_2^* Y_1 - e^{j\theta_1} h_1 Y_2^*$$

In these embodiments, the effective channels between the transmit antennas and the receive antenna due to uncoupled phase noise may be represented as ($h_1 e^{j\theta_1}$ and $h_2 e^{j\theta_2}$) instead of ($h_1$ and $h_2$). In the above equations, $Y_1$ and $Y_2$ represent respectively, the first and second consecutively received data symbols in a given subcarrier, $R_1$ and $R_2$ represent respectively the decision metrics corresponding to the data symbols $X_1$ and $X_2$ in the same subcarrier transmitted in the first and second received OFDM symbols, $h_1$ represents the channel estimates for first channel 113 (FIG. 1) between first transmit antenna 112 (FIG. 1) and receive antenna 116 (FIG. 1) on the same subcarrier, $h_2$ represents the channel estimates for second channel 115 (FIG. 1) between second transmit antenna 114 (FIG. 1) and receive antenna 116, (FIG. 1) on the same subcarrier, $\theta_1$ represents the CPE estimate for first channel 113 (FIG. 1), $\theta_2$ represents the CPE estimate for second channel 115 (FIG. 1), and the symbol * indicates the complex conjugate. In the above equation, the negative sign before a "j" indicates a counter-rotation of the channel estimate by the CPE estimate.

The decision metrics ($R_1$ and $R_2$) may be viewed as measures of the reliability of the transmitted constellation symbols ($X_1$ and $X_2$) and may be used by error correcting decoder 314 to form a decision on the information that was originally encoded by error correcting encoder 202 (FIG. 2) and subsequently transmitted. In some embodiments, the received data symbols ($Y_1$ and $Y_2$) are the constellation points in identical tones in the received and demultiplexed OFDM symbols, although the scope of the invention is not limited in this respect.

In some embodiments, CPE estimator 322 may generate the first CPE estimate ($\theta_1$) based on a difference between the training components of consecutively received OFDM symbols ($Q_1$ and $Q_2$) for corresponding subcarriers. In these embodiments, CPE estimator 322 may generate the first CPE estimate ($\theta_1$) based on the following equation:

$$\theta_1 = \arg\{\Sigma_{s=1}^{8} (h_1(s) P(s))^* (Q_1(s) - Q_2(s))\}$$

In these embodiments, CPE estimator 322 may generate the second CPE estimate ($\theta_2$) based on a sum of the training components of the consecutively received OFDM symbols ($Q_1$ and $Q_2$) for corresponding subcarriers. In these embodiments, CPE estimator 322 may generate the second CPE estimate ($\theta_2$) based on the following equation:

$$\theta_2 = \arg\{\Sigma_{s=1}^{8} (h_2(s) P(s))^* (Q_1(s) + Q_2(s))\}$$

In the above equations, $Q_1$ and $Q_2$ represent respectively, first and second consecutively received OFDM pilot symbols for each pilot subcarrier 's', and P(s) represents pilot symbols of a known sequence transmitted by at least two antennas of a transmitter. In this example equation, the CPEs are calculated for embodiments that employ eight pilot subcarriers, although the scope of the invention is not limited in this respect. In these embodiments, CPE estimator 322 may perform sixteen multiplication operations and fifteen addition/subtraction operations for each CPE estimate.

In some embodiments, CPE estimator 322 may generate the first CPE estimate ($\theta_1$) by performing a computation of a complex conjugate of a multiplication of a known pilot tone by a corresponding channel estimate for the first channel, by performing a subtraction of the received pilot tones of a second of the consecutively received OFDM symbols from the received pilot tones of a first of the consecutively received OFDM symbols, by performing a multiplication of results of the computation and the subtraction, and by performing a repetition of the computation, subtraction and multiplication for each pilot tone of the consecutively received OFDM symbols and a summation of results of the repetition. In some embodiments, CPE estimator 322 may generate the second CPE estimate ($\theta_2$) by performing a computation of a complex conjugate of a multiplication of a known pilot tone by a corresponding channel estimate for the second channel, by performing an addition of the received pilot tones of a second of the consecutively received OFDM symbols and the received pilot tones of a first of the consecutively received OFDM symbols, by performing a multiplication of results of the computation and the addition, and by performing a repetition of the computation, addition and multiplication for each pilot tone of the consecutively received OFDM symbols and a summation of results of the repetition.

An example of training components that may be suitable for use with these embodiments of the present invention are illustrated in FIG. 3B. In FIG. 3B, the training component 331 of the first OFDM symbol may be transmitted by the first and second transmit antennas (Tx1 and Tx2) as indicated. The transmission of the training component 331 of the first OFDM symbol may be followed by the transmission of training component 332 of the second OFDM symbol, which also may be transmitted by the first and second transmit antennas as indicated. In these embodiments, both transmit antennas (Tx1 and Tx2) may concurrently transmit a same sequence of pilot symbols during transmission of training component 331 of the first OFDM symbol, and may concurrently transmit opposite sequences of the pilot symbols during transmission of training component 332 of the second OFDM symbol, although the scope of the invention is not limited in this respect.

In some embodiments, the pilot sequence over pairs of OFDM symbols may be orthogonal for each transmit antenna. In some embodiments, illustrated in FIG. 3B, during the transmission of training component 332 of the second OFDM symbol, the first transmit antenna (Tx1) transmits opposite pilot sequence 352 on the pilot tones while the second transmit antenna (Tx2) transmits the same pilot sequence 351 that was transmitted by both transit antennas in the training component 331 of the first OFDM symbol, although the scope of the invention is not limited in this respect.

In the embodiments, illustrated in FIG. 3B, eight pilot tones may be employed to track and compensate for effects such as phase noise, although the scope of the invention is not limited in this respect. These embodiments may be compatible with the IEEE 802.16(d) standard for space-time coded mode, although the scope of the invention is not limited in this respect. In these embodiments, during the first OFDM symbol, both transmit antennas may employ pilot tones P(s) for s=1 to 8, illustrated as '+' and '−'. During the second OFDM symbol, the first transmit antenna may employ pilot tones −P(s) while the second transmit antenna may employ P(s). Since the pilot sequence is usually real, the pilots are effectively space-time encoded as well. FIG. 3B illustrates the pilot tones that result from space-time encoding in a downlink to within a global multiplicative factor of +/−1, where + indicates +1 and − indicates −1.

In these embodiments, the corresponding received pilot tones for the first and second OFDM symbols, in a frequency selective environment, may be represented by:

$Q_1(s)=h_1(s)e^{j\theta_1}P(s)+h_2(s)e^{j\theta_2}P(s)+\text{Noise}$ $Q_2(s)=-h_1(s)e^{j\theta_1}P(s)+h_2(s)e^{j\theta_2}P(s)+\text{Noise}$ In these equations, the noise terms (i.e., Noise) may include additive white Gaussian noise (AWGN) and inter-carrier interference (ICI), and may be zero mean, although the scope of the invention is not limited in this respect.

Some alternate embodiments may use interleaved pilot sequences. An example of the training components of interleaved pilot sequences is illustrated in FIG. 3C. In these embodiments, the training components 361, 362 of the first and second OFDM symbols may be consecutively transmitted by a transmitting station and may comprise first and second interleaved pilot sequences 371, 372. As illustrated, first and second interleaved pilot sequences 371, 372, referred to as $P_1$ and $P_2$, respectively, may comprise interleaved pilot tones.

In these embodiments, CPE estimator 322 may estimate the first CPE estimate ($\theta_1$) based on a difference between a multiplication of the training component of the first received OFDM symbol ($Q_1$) by the conjugate of the multiplication of the known training component of the first OFDM symbol ($P_1$) multiplied by the first channel estimate ($h_1$) and a multiplication of the training component of the second received OFDM symbol ($Q_2$) by the conjugate of the multiplication of the known training component of the second OFDM symbol ($P_2$) multiplied by the first channel estimate ($h_1$). In these embodiments, CPE estimator 322 may generate first CPE estimate ($\theta_1$) based on the following equation:

$\theta_1 = \arg\{\Sigma_{s=1}^{8}(h_1(s)P_1(s))^*Q_1(s) - \Sigma_{s=1}^{8}(h_1(s)P_2(s))^*Q_2(s)\}$ In these embodiments, CPE estimator 322 may estimate the second CPE estimate ($\theta_2$) based on a sum of a multiplication of the training component of the first received OFDM symbol ($Q_1$) by the conjugate of the multiplication of the known training component of the second OFDM symbol ($P_2$) multiplied by the second channel estimate ($h_2$) and a multiplication of the training component of the second received OFDM symbol ($Q_2$) by the conjugate of the multiplication of the known training component of the first OFDM symbol ($P_1$) multiplied by the second channel estimate ($h_2$). In these embodiments, CPE estimator 322 may generate the second CPE estimate ($\theta_2$) based on the following equation:

$\theta_2 = \arg\{\Sigma_{s=1}^{8}(h_2(s)P_2(s))^*Q_1(s) + \Sigma_{s=1}^{8}(h_2(s)P_1(s))^*Q_2(s)\}$ In some embodiments, the values of the first and second interleaved pilot sequences 371, 372 may be transmitted on alternating subcarriers, as illustrated in FIG. 3C. During the transmission of the training component 361 of the first OFDM symbol, the first of interleaved pilot sequences 371 may be transmitted by a first transmit antenna (Tx1) and the second of interleaved pilot sequences 372 may be transmitted by a second transmit antenna (Tx2). During transmission of training component 362 of the second OFDM symbol, the first of interleaved pilot sequences 371 may be transmitted by the second transmit antenna (Tx2) and an inverse of the second of interleaved pilot sequences 373 may be transmitted by the first transmit antenna.

In some embodiments, during transmission of training component 361 of the first OFDM symbol, the first of interleaved pilot sequences 371 may be transmitted by the first transmit antenna on odd numbered pilot subcarriers and the second of interleaved pilot sequences 372 may be transmitted by the second transmit antenna on even numbered pilot subcarriers, although the scope of the invention is not limited in this respect. FIG. 3C illustrates the pilot sequences with either a '+' or a '−', and illustrates no transmission with a '0'. In these embodiments, because the training sequences have half their terms zeroed out, CPE estimator 322 may, for example, perform sixteen multiplication operations and seven addition/subtraction operations for each CPE estimate.

In some embodiments, during transmission of the training component 362 of the second OFDM symbol, the first of interleaved pilot sequences 371 may be transmitted by the second transmit antenna on odd numbered pilot subcarriers, and an inverse of the second of interleaved pilot sequences 372 (shown as sequence 373) may be transmitted on the first antenna on even numbered pilot subcarriers, although the scope of the invention is not limited in this respect. This is also illustrated in FIG. 3C.

Although multicarrier transmitter 200 (FIG. 2) and multicarrier receiver 300 (FIG. 3A) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of multicarrier transmitter 200 (FIG. 2) and/or multicarrier receiver 300 (FIG. 3A) may refer to one or more processes operating on one or more processing elements.

Figure 4:
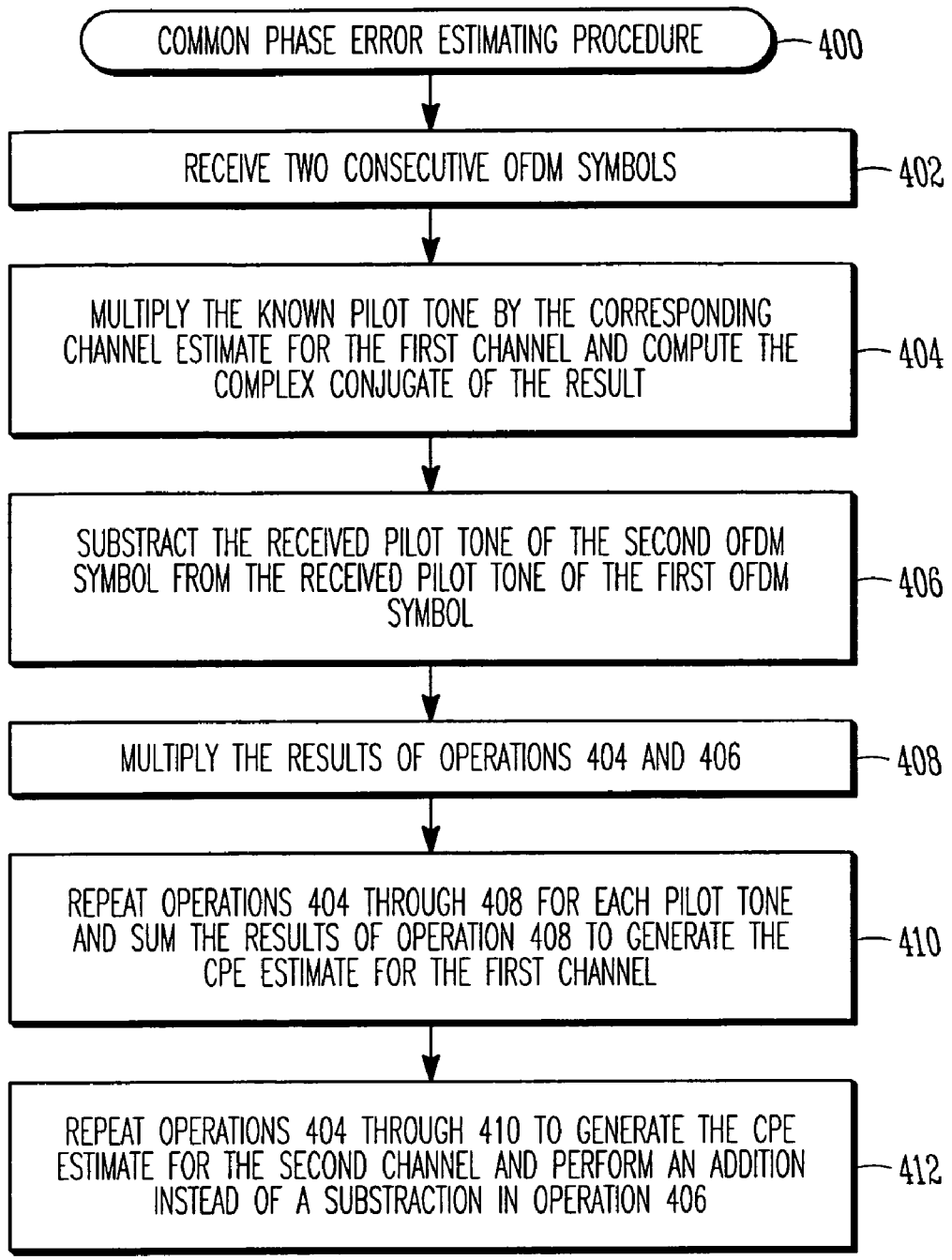
FIG. 4 is a flow chart of a common phase error estimation procedure in accordance with some embodiments of the present invention.

FIG. 4 is a flow chart of common phase error estimation procedure 400 in accordance with some embodiments of the present invention. In these embodiments, the training component of OFDM symbols illustrated in FIG. 3B may be used, although the scope of the invention is not limited in this respect.

Operation 402 comprises receiving two consecutive OFDM symbols. The consecutively received OFDM symbols may be non-preamble OFDM symbols referring to OFDM symbols that are not OFDM training symbols. A non-preamble OFDM symbol may include both training components transmitted on the pilot tones and data components transmitted on the data tones. In some embodiments, operation 402 may provide training components of the consecutively received OFDM symbols illustrated as $Q_1$ and $Q_2$.

Operation 404 comprises multiplying the known pilot tone by the corresponding channel estimate for the first channel and computing the complex conjugate of the result. In some embodiments, operation 404 may compute $(P(s)h_1(s))^*$ for a particular pilot tone "s".

Operation 406 comprises subtracting the received pilot tone of the second OFDM symbol from the received pilot tone of the first OFDM symbol. In some embodiments, operation 406 may compute $Q_1(s) - Q_2(s)$.

Operation 408 comprises multiplying the results of operations 404 and 406. In some embodiments, operation 408 may compute $((P(s)h_1(s))^*)(Q_1(s) - Q_2(S))$.

Operation 410 comprises repeating operations 404 through 408 for each pilot tone and summing the results of operation 408 to generate the CPE estimate for the first channel. In some embodiments, operation 410 may compute:

$$\theta_1 = \arg\{\Sigma_{s=1}^8 (h_1(s)P(s))^*(Q_1(s) - Q_2(s))\},$$

in the case of eight pilot subcarriers.

Operation 412 comprises repeating operations 404 through 410 to generate the CPE estimate for the second channel using the channel estimate for the second channel and performing an addition instead of a subtraction in operation 406. In some embodiments, operation 412 may compute:

$$\theta_2 = \arg\{\Sigma_{s=1}^8 (h_2(s)P(s))^*(Q_1(s) - Q_2(s))\},$$

in the case of eight pilot subcarriers.

Figure 5:
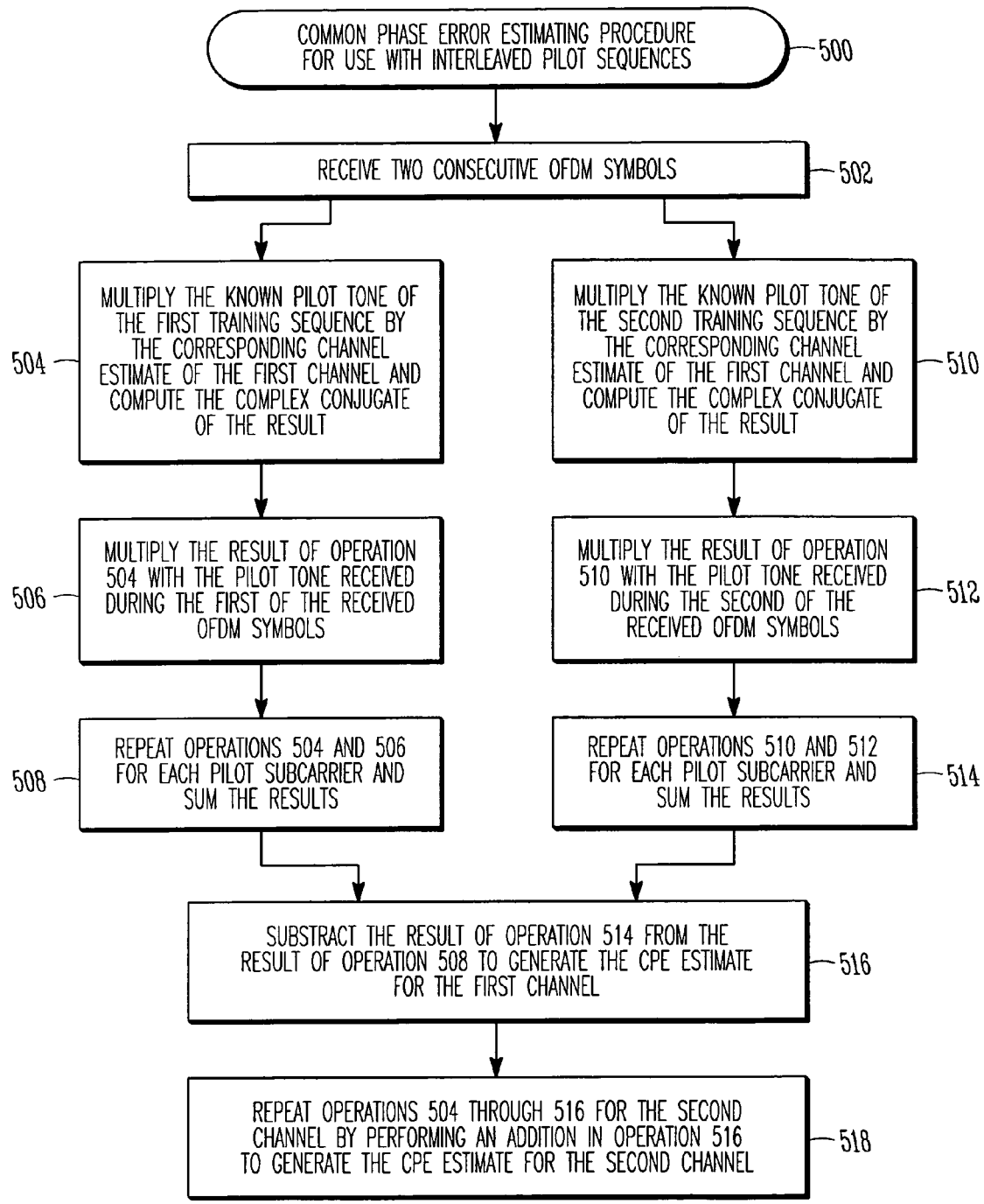
FIG. 5 is a flow chart of a common phase error estimation procedure for use with interleaved pilot sequences in accordance with some alternative embodiments of the present invention.

FIG. 5 is a flow chart of common phase error estimation procedure 500 for use with interleaved pilot sequences in accordance with some alternative embodiments of the present invention. In these embodiments, the OFDM training symbols illustrated in FIG. 3C may be used, although the scope of the invention is not limited in this respect.

Operation 502 comprises receiving two consecutive OFDM symbols that are not OFDM training symbols. In some embodiments, operation 502 may provide training components of the consecutively received OFDM symbols (i.e., $Q_1$ and $Q_2$).

Operation 504 comprises multiplying the known pilot tone of the first training sequence by the corresponding channel estimate of the first channel and computing the complex conjugate of the result. In some embodiments, operation 504 may compute $(h_1(s)P_1(s))^*$ for a particular pilot tone "s".

Operation 506 comprises multiplying the result of operation 504 with the pilot tone received during the first consecutively received OFDM symbol. In some embodiments, operation 506 may compute $((h_1(s)P_1(s))^*)Q_1(s)$.

Operation 508 comprises repeating operations 504 and 506 for each pilot subcarrier and summing the results. In some embodiments, operation 508 may compute $\Sigma((h_1(s)P_1(s))^*)Q_1(s)$ for s=1 to 8, in the case of eight pilot subcarriers.

Operation 510 comprises multiplying the known pilot tone of the second training sequence by the corresponding channel estimate of the first channel and computing the complex conjugate of the result. In some embodiments, operation 510 may compute $(h_1(S)P_2(S))^*$ for a particular pilot tone "s".

Operation 512 comprises multiplying the result of operation 510 with a pilot tone received during the second consecutively received OFDM symbol. In some embodiments, operation 512 may compute $((h_1(s)P_2(s))^*)Q_2(s)$.

Operation 514 comprises repeating operations 510 and 512 for each pilot subcarrier and summing the results. In some embodiments, operation 514 may compute $\Sigma((h_1(s)P_2(s))^*)Q_2(s)$ for s=1 to 8, in the case of eight pilot subcarriers.

Operation 516 comprises subtracting the result of operation 514 from the result of operation 508 to generate the CPE estimate for the first channel. In some embodiments, operation 516 may compute:

$$\theta_1 = \arg\{\Sigma_{s=1}^8 (h_1(s)P_1(s))^* Q_1(s) - \Sigma_{s=1}^8 (h_1(s)P_2(s))^* Q_2(s)\}$$

Operation 518 comprises repeating operations 504 through 516 using the channel estimate for the second channel and the pilot tones for the second of the consecutively received OFDM symbols. Operation 518 also comprises adding the result of operation 514 to the result of operation 508 in operation 516 (rather than subtracting) to generate the CPE estimate for the second channel. In operation 518, the pilot tones for the first consecutively received OFDM symbol are used instead of the pilot tones for the second consecutively received OFDM symbol in operations 508 and 514. In some embodiments, operation 518 may compute:

$$\theta_2 = \arg\{\Sigma_{s=1}^8 (h_2(s)P_2(s))^* Q_1(s) + \Sigma_{s=1}^8 (h_2(s)P_1(s))^* Q_2(s)\}$$

Although the individual operations of procedures 400 (FIG. 4) and 500 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Some embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A multicarrier receiver comprising:
Fourier transform circuitry to generate frequency-domain signals from consecutively received multicarrier symbols concurrently transmitted by at least two transmit antennas;
a channel estimator to generate channel estimates from training components of the frequency-domain signals of the consecutively received multicarrier symbols;
a common phase error (CPE) estimator to generate CPE estimates by using the channel estimates provided by the channel estimator and by using the training components of the frequency-domain signals of the consecutively received multicarrier symbols provided by the Fourier transform circuitry; and
a space-time decoder to decode data components of the frequency-domain signals of the consecutively received multicarrier symbols by using both the channel estimates and the CPE estimates,
wherein the CPE estimator generates a first CPE estimate for a first channel between the receiver and a transmitter and generates a second CPE estimate for a second channel between the receiver and the transmitter,
wherein the CPE estimates are generated to compensate for uncoupled phase noise resulting from the transmission of the multicarrier symbols with an independent local oscillator associated with each of the transmit antennas, and
wherein the consecutively received OFDM symbols comprise first and second consecutively received OFDM symbols that are consecutively transmitted by the transmitter and include first and second interleaved pilot sequences.

2. The multicarrier receiver of claim 1 wherein the space-time decoder either rotates or counter-rotates versions of the channel estimates by the CPE estimates for use in weighting and combining the data components to generate decision metrics corresponding to decoded symbols.

3. The multicarrier receiver of claim 2 wherein the consecutively received multicarrier symbols are consecutively received orthogonal frequency division multiplexed (OFDM) symbols.

4. The multicarrier receiver of claim 3 wherein the CPE estimator generates the first CPE estimate based on a difference between the training components of the consecutively received OFDM symbols for corresponding subcarriers, and
wherein the CPE estimator generates the second CPE estimate based on a sum of the training components of the consecutively received OFDM symbols for corresponding subcarriers.

5. The multicarrier receiver of claim 4 wherein the CPE estimator generates the second CPE estimate by performing:
a computation of a complex conjugate of a multiplication of a known pilot tone by a corresponding channel estimate for the second channel,
an addition of a received pilot tone of a second of the consecutively received OFDM symbols and a received pilot tone of a first of the consecutively received OFDM symbols,
a multiplication of results of the computation and the addition, and
a repetition of the computation, addition and multiplication for each pilot tone of the consecutively received OFDM symbols and a summation of results of the repetition.

6. The multicarrier receiver of claim 4 wherein the transmit antennas concurrently transmit a same sequence of pilot symbols as the training components of a first of the consecutively received OFDM symbols, and
wherein the transmit antennas concurrently transmit opposite sequences of the pilot symbols as the training components of a second of the consecutively received OFDM symbols.

7. The multicarrier receiver of claim 3
wherein the CPE estimator estimates the first CPE estimate based on a difference between a multiplication of received pilot tones of the first consecutively received OFDM symbol by the conjugate of the known pilot tones for the first consecutively received OFDM symbol and a multiplication of received pilot tones of the second consecutively received OFDM symbol by the conjugate of the known pilot tones for the second consecutively received OFDM symbol.

8. The multicarrier receiver of claim 7 wherein the CPE estimator estimates the second CPE estimate based on a sum of a multiplication of the received pilot tones of the first consecutively received OFDM symbol by the conjugate of the known pilot tones for the second consecutively received OFDM symbol and a multiplication of the received pilot tones of the second consecutively received OFDM symbol by the conjugate of the known pilot tones for the first consecutively received OFDM symbol.

9. The multicarrier receiver of claim 4 wherein the space-time decoder comprises an Alamouti-type decoder,
wherein the consecutively received OFDM symbols comprise first and second consecutively received OFDM symbols, wherein the transmitter transmits data tones during first and second consecutively transmitted OFDM symbols corresponding respectively to the first and second consecutively received OFDM symbols, wherein as part of the data tones of the first consecutively transmitted OFDM symbol, the transmitter transmits first data with the first transmit antenna and a negative conjugate of second data with the second transmit antenna, and wherein as part of the data tones of the second consecutively transmitted OFDM symbol, the transmitter transmits the second data with the first transmit antenna and a conjugate of the first data with the second transmit antenna.

10. The multicarrier receiver of claim 9 wherein each channel is associated with one of the transmit antennas and the transmit antennas are part of single transmitting station, and wherein radio-frequency signals transmitted by the transmit antennas of the transmitting station are generated by the independent local oscillators.

11. The multicarrier receiver of claim 1 wherein each channel is associated with one of the transmit antennas and each transmit antenna is associated with a separate transmitting station, wherein the consecutively received multicarrier symbols correspond respectively to first and second consecutively transmitted multicarrier symbols, wherein a first of the separate transmitting stations provides first and the second data to a second of the separate transmitting stations via either a wired or wireless communication link, wherein as part of the first consecutively transmitted multicarrier symbol, the first transmitting station transmits the first data with the first transmit antenna and the second transmitting station transmits a negative conjugate of the second data with the second transmit antenna, and wherein as part of the second consecutively transmitted multicarrier symbol, the first transmitting station transmits the second data with the first transmit antenna and the second transmitting station transmits a conjugate of the first data with the second transmit antenna.

12. A multicarrier receiver comprising:

Fourier transform circuitry to generate frequency-domain signals from consecutively received multicarrier symbols concurrently transmitted by at least two transmit antennas;

a channel estimator to generate channel estimates from training components of the frequency-domain signals of the consecutively received multicarrier symbols;

a common phase error (CPE) estimator to generate CPE estimates by using the channel estimates provided by the channel estimator and by using the training components of the frequency-domain signals of the consecutively received multicarrier symbols provided by the Fourier transform circuitry; and a space-time decoder to decode data components of the frequency-domain signals of the consecutively received multicarrier symbols by using both the channel estimates and the CPE estimates, wherein the CPE estimator generates a first CPE estimate for a first channel between the receiver and a transmitter and generates a second CPE estimate for a second channel between the receiver and the transmitter, wherein the CPE estimator generates the first CPE estimate by performing:

a computation of a complex conjugate of a multiplication of a known pilot tone by a corresponding channel estimate for the first channel, a subtraction of a received pilot tone of a second of the consecutively received OFDM symbols from a received pilot tone of a first of the consecutively received OFDM symbols, a multiplication of results of the computation and the subtraction, and a repetition of the computation, subtraction and multiplication for each pilot tone of the consecutively received OFDM symbols and a summation of results of the repetition.

13. A multicarrier receiver comprising:

a common phase error (CPE) estimator to generate CPE estimates from channel estimates and from training components of consecutively received multicarrier symbols concurrently transmitted by at least two transmit antennas; and a space-time decoder to decode data components of the consecutively received multicarrier symbols using the channel estimates and the CPE estimates, wherein the CPE estimator generates a first CPE estimate for a first channel between the receiver and a transmitter and generates a second CPE estimate for a second channel between the receiver and the transmitter, wherein the space-time decoder either rotates or counter-rotates versions of the channel estimates by the CPE estimates for use in weighting and combining the data components to generate decision metrics corresponding to decoded symbols, wherein the consecutively received multicarrier symbols are consecutively received orthogonal frequency division multiplexed (OFDM) symbols, wherein the consecutively received OFDM symbols comprise first and second consecutively received OFDM symbols that are consecutively transmitted by the transmitter and include first and second interleaved pilot sequences, wherein the CPE estimator estimates the first CPE estimate based on a difference between a multiplication of received pilot tones of the first consecutively received OFDM symbol by the conjugate of the known pilot tones for the first consecutively received OFDM symbol and a multiplication of received pilot tones of the second consecutively received OFDM symbol by the conjugate of the known pilot tones for the second consecutively received OFDM symbol, wherein the CPE estimator estimates the second CPE estimate based on a sum of a multiplication of the received pilot tones of the first consecutively received OFDM symbol by the conjugate of the known pilot tones for the second consecutively received OFDM symbol and a multiplication of the received pilot tones of the second consecutively received OFDM symbol by the conjugate of the known pilot tones for the first consecutively received OFDM symbol, wherein the first and second interleaved pilot sequences are transmitted on alternating subcarriers, wherein during transmission of the known pilot tones of the first consecutively received OFDM symbol, the first interleaved pilot sequence is transmitted by the first transmit antenna and the second interleaved pilot sequence is transmitted by the second transmit antenna, and wherein during transmission of the known pilot tones of the second consecutively received OFDM symbol, the first interleaved pilot sequence is transmitted by the second transmit antenna and an inverse of the second interleaved pilot sequence is transmitted by the first transmit antenna.

14. A method of decoding signals comprising:
generating frequency-domain signals with Fourier transform circuitry from consecutively received multicarrier symbols concurrently transmitted by at least two transmit antennas;
generating channel estimates with a channel estimator from training components of the frequency-domain signals of the consecutively received multicarrier symbols;
generating common phase error (CPE) estimates by using the channel estimates provided by the channel estimator and by using the training components of the frequency-domain signals of the consecutively received multicarrier symbols provided by the Fourier transform circuitry; and
space-time decoding data components of the frequency-domain signals of the consecutively received multicarrier symbols by using both the channel estimates and the CPE estimates,
wherein a first CPE estimate is generated for a first channel between a receiver and a transmitter and a second CPE estimate is generated for a second channel between the receiver and the transmitter,
wherein the CPE estimates are generated to compensate for uncoupled phase noise resulting from the transmission of the multicarrier symbols with an independent local oscillator associated with each of the transmit antennas, and
wherein the consecutively received OFDM symbols comprise first and second consecutively received OFDM symbols that are consecutively transmitted by the transmitter and include first and second interleaved pilot sequences.

15. The method of claim 14 wherein the space-time decoding includes either rotating or counter-rotating versions of the channel estimates by the CPE estimates for use in weighting and combining the data components to generate decision metrics corresponding to decoded symbols.

16. The method of claim 15 wherein the consecutively received multicarrier symbols are consecutively received orthogonal frequency division multiplexed (OFDM) symbols.

17. The method of claim 16 wherein generating the CPE estimates comprises generating the first CPE estimate based on a difference between the training components of the consecutively received OFDM symbols for corresponding subcarriers, and generating the second CPE estimate based on a sum of the training components of the consecutively received OFDM symbols for corresponding subcarriers.

18. The method of claim 17 wherein the second CPE estimate is generated by performing:
a computation of a complex conjugate of a multiplication of a known pilot tone by a corresponding channel estimate for the second channel,
an addition of a received pilot tone of a second of the consecutively received OFDM symbols and a received pilot tone of a first of the consecutively received OFDM symbols,
a multiplication of results of the computation and the addition, and
a repetition of the computation, addition and multiplication for each pilot tone of the consecutively received OFDM symbols and a summation of results of the repetition.

19. The method of claim 17 wherein the transmit antennas concurrently transmit a same sequence of pilot symbols as the training components of a first of the consecutively received OFDM symbols, and
wherein the transmit antennas concurrently transmit opposite sequences of the pilot symbols as the training components of a second of the consecutively received OFDM symbols.

20. The method of claim 16
wherein the first CPE estimate is generated based on a difference between a multiplication of received pilot tones of the first consecutively received OFDM symbol by the conjugate of the known pilot tones for the first consecutively received OFDM symbol and a multiplication of received pilot tones of the second consecutively received OFDM symbol by the conjugate of the known pilot tones for the second consecutively received OFDM symbol.

21. The method of claim 20 wherein the second CPE estimate is generated based on a sum of a multiplication of the received pilot tones of the first consecutively received OFDM symbol by the known pilot tones for the second consecutively received OFDM symbol and a multiplication of the received pilot tones of the second consecutively received OFDM symbol by the known pilot tones for the first consecutively received OFDM symbol.

22. The method of claim 17 wherein the space-time decoding comprises performing Alamouti-type decoding,
wherein the consecutively received OFDM symbols comprise first and second consecutively received OFDM symbols,
wherein the transmitter transmits data tones during first and second consecutively transmitted OFDM symbols corresponding respectively to the first and second consecutively received OFDM symbols,
wherein as part of the data tones of the first consecutively transmitted OFDM symbol, the transmitter transmits first data with the first transmit antenna and a negative conjugate of second data with the second transmit antenna, and
wherein as part of the data tones of the second consecutively transmitted OFDM symbol, the transmitter transmits the second data with the first transmit antenna and a conjugate of the first data with the second transmit antenna.

23. The method of claim 22 wherein each channel is associated with one of the transmit antennas and the transmit antennas are part of single transmitting station, and
wherein radio-frequency signals transmitted by the transmit antennas of the transmitter are generated by independent local oscillators.

24. The method of claim 14 wherein each channel is associated with one of the transmit antennas and each transmit antenna is associated with a separate transmitting station,
wherein the consecutively received multicarrier symbols correspond respectively to first and second consecutively transmitted multicarrier symbols,
wherein a first of the separate transmitting stations provides first and the second data to a second of the separate transmitting stations via either a wired or wireless communication link,
wherein as part of the first consecutively transmitted multicarrier symbol, the first transmitting station transmits the first data with the first transmit antenna and the second transmitting station transmits a negative conjugate of the second data with the second transmit antenna, and wherein as part of the second consecutively transmitted multicarrier symbol, the first transmitting station transmits the second data with the first transmit antenna and the second transmitting station transmits a conjugate of the first data with the second transmit antenna.

25. A method of decoding signals comprising:

generating frequency-domain signals with Fourier transform circuitry from consecutively received multicarrier symbols concurrently transmitted by at least two transmit antennas;

generating channel estimates with a channel estimator from training components of the frequency-domain signals of the consecutively received multicarrier symbols;

generating common phase error (CPE) estimates by using the channel estimates provided by the channel estimator and by using the training components of the frequency-domain signals of the consecutively received multicarrier symbols provided by the Fourier transform circuitry; and space-time decoding data components of the frequency-domain signals of the consecutively received multicarrier symbols by using both the channel estimates and the CPE estimates, wherein a first CPE estimate is generated for a first channel between a receiver and a transmitter and a second CPE estimate is generated for a second channel between the receiver and the transmitter, wherein the first CPE estimate is generated by performing:

a computation of a complex conjugate of a multiplication of a known pilot tone by a corresponding channel estimate for the first channel, a subtraction of a received pilot tone of a second of the consecutively received OFDM symbols from a received pilot tone of a first of the consecutively received OFDM symbols, a multiplication of results of the computation and the subtraction, and a repetition of the computation, subtraction and multiplication for each pilot tone of the consecutively received OFDM symbols and a summation of results of the repetition.

26. A method of decoding signals comprising:

generating common phase error (CPE) estimates from channel estimates and training components of consecutively received multicarrier symbols concurrently transmitted by two or more transmit antennas; and space-time decoding data components of the consecutively received multicarrier symbols using the channel estimates and the CPE estimates, wherein a first CPE estimate is generated for a first channel between a receiver and a transmitter and a second CPE estimate is generated for a second channel between the receiver and the transmitter, wherein the space-time decoding includes either rotating or counter-rotating versions of the channel estimates by the CPE estimates for use in weighting and combining the data components to generate decision metrics corresponding to decoded symbols, wherein the consecutively received multicarrier symbols are consecutively received orthogonal frequency division multiplexed (OFDM) symbols, wherein the consecutively received OFDM symbols comprise first and second consecutively received OFDM symbols that are consecutively transmitted by the transmitter and include first and second interleaved pilot sequences, wherein the first CPE estimate is generated based on a difference between a multiplication of received pilot tones of the first consecutively received OFDM symbol by the conjugate of the known pilot tones for the first consecutively received OFDM symbol and a multiplication of received pilot tones of the second consecutively received OFDM symbol by the conjugate of the known pilot tones for the second consecutively received OFDM symbol, wherein the first and second interleaved pilot sequences are transmitted on alternating subcarriers, wherein during transmission of the known pilot tones of the first consecutively received OFDM symbol, the first interleaved pilot sequence is transmitted by the first transmit antenna and the second interleaved pilot sequence is transmitted by the second transmit antenna, and wherein during transmission of the known pilot tones of the second consecutively received OFDM symbol, the first interleaved pilot sequence is transmitted by the second transmit antenna and an inverse of the second interleaved pilot sequence is transmitted by the first transmit antenna.

* * * * *